US008668573B1

(12) United States Patent
Mayeroff

(10) Patent No.: US 8,668,573 B1
(45) Date of Patent: Mar. 11, 2014

(54) GAMING DEVICE AND METHOD OF ISSUING A BONUS AWARD

(75) Inventor: Jason Mayeroff, Bangkok (TH)

(73) Assignee: Battle Born Gaming, Inc., Victoria (SC)

( * ) Notice: Subject to any disclaimer, the term of this patent is extended or adjusted under 35 U.S.C. 154(b) by 1876 days.

(21) Appl. No.: 11/827,574

(22) Filed: Jul. 11, 2007

Related U.S. Application Data

(63) Continuation-in-part of application No. 10/815,304, filed on Mar. 31, 2004, now abandoned.

(60) Provisional application No. 60/464,937, filed on Apr. 22, 2003.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/20; 463/16; 463/25; 463/26; 463/32; 463/34; 463/46

(58) Field of Classification Search
USPC ....................... 463/20, 25, 26, 32, 34, 46, 16
See application file for complete search history.

(56) References Cited

U.S. PATENT DOCUMENTS

| | | | | |
|---|---|---|---|---|
| 6,059,658 | A * | 5/2000 | Mangano et al. | 463/16 |
| 6,089,978 | A * | 7/2000 | Adams | 463/20 |
| 6,149,273 | A * | 11/2000 | Matthews | 351/221 |
| 6,203,429 | B1 * | 3/2001 | Demar et al. | 463/20 |
| 2002/0065126 | A1 * | 5/2002 | Miller et al. | 463/20 |
| 2003/0060258 | A1 * | 3/2003 | Coleman et al. | 463/16 |
| 2003/0060277 | A1 * | 3/2003 | Webb et al. | 463/25 |

* cited by examiner

*Primary Examiner* — Adetokunbo O Torimiro
(74) *Attorney, Agent, or Firm* — Robert Ryan Morishita; Morishita Law Firm, LLC

(57) ABSTRACT

A method for conducting a game includes defining at least one bonus selection event and at least one bonus award event. Play of a game is monitored for the occurrence of a bonus selection event. In response to a bonus selection event, a bonus selection apparatus is controlled to select one or more bonus award indicia. The bonus award indicia are stored and displayed at a bonus award escrow display. In response to a bonus award event, a bonus award associated with a bonus award indicia stored and displayed at the bonus award escrow display is issued to the player.

28 Claims, 9 Drawing Sheets

GAMING DEVICE AND METHOD OF ISSUING A BONUS AWARD

RELATED APPLICATION DATA

The present application is a continuation-in-part of U.S. patent application Ser. No. 10/815,304, entitled "Gaming Device and Method of Display a Changeable Bonus Value Feature," filed Mar. 31, 2004 now abandoned by Applicant herein which, in turn, claimed the benefit of U.S. Provisional Patent Application Ser. No. 60/464,937, entitled "Gaming Device and Method of Displaying a Three-Dimensional Bonus Feature," filed Apr. 22, 2003 by Applicant herein.

FIELD OF THE INVENTION

This invention relates to gaming machines which include a bonus display. Specifically, the present invention relates to a method and device for conducting a game that includes a bonus selection apparatus and a primary game display.

BACKGROUND OF THE INVENTION

Casino gaming machines are well known in the art. Such devices may be embodied as spinning reel slot machines, video slot machines, video poker machines or the like. These machines are played by a player making a wager and prompting play. A game processor, such as a computer processor, selects and displays an outcome. In a typical slot machine, card game machine, or the like, the processor selects and displays an outcome by randomly selecting and displaying game indicia (such as slot reel symbols, playing cards, or the like). A determination is made whether the outcome is a winning or losing outcome based on the combination of game indicia selected and displayed. Depending on the type of game, the combinations may be examined based on some predefined constraint such as predefined pay lines, or the like. While different games treat awards different, generally speaking, the player is rewarded for winning outcomes. Losing outcomes usually result in the loss of the player's wager, e.g. the player's wager amount is retained by the gaming device.

It has become popular to provide gaming machines with secondary features, such as bonus games, side bets, bonus awards, secondary games, or the like. For example, in a conventional bonus feature gaming machine, a player places a wager and plays a base game to conclusion. If the outcome of the base game includes a trigger condition, a bonus feature is enabled. The bonus feature may entail the display of bonus outcome selections where the player makes a selection to reveal a bonus. In another popular game, a bonus feature is embodied as an electro-mechanical wheel that spins to display a bonus amount.

However, a disadvantage of the current systems is that the secondary feature typically runs only after winning outcomes. That is, in most systems, the trigger condition for the secondary feature is that the player win. Aside from the fact that losing players are generally excluded from participating in secondary features, this also means that secondary features run very rarely. Since it is known that secondary features generate player interest in a game, using only winning outcomes to trigger a secondary feature would tend to minimize the effect of the secondary feature to both generate initial participation by a player in a game and retain a player at a game.

SUMMARY OF THE INVENTION

The present invention includes a device for conducting a game for a player. The device includes a game processor and a primary game display in communication with the game processor.

A bonus selection apparatus communicates with the game processor. The bonus selection apparatus includes bonus award indicia associated with one or more bonus awards. The bonus selection apparatus could take many different forms.

For example, in an optional embodiment, the bonus selection apparatus includes at least one two-dimensional object with the bonus award indicia arranged on the surface of the bonus selection apparatus. The bonus selection apparatus is rotationally mounted at the device so that it can be controlled to rotate. Examples of such an optional embodiment could include a wheel or segmented displays. For example, in one such optional embodiment, the bonus selection apparatus includes a first bonus selection segment and a second bonus selection segment adapted for relative rotation with respect to one another. The bonus award indicia are arranged about the perimeter of at least one of the first bonus selection segment and second bonus selection segment. In a further optional embodiment, at least one of the bonus award indicia is divided into two or more bonus award indicia components, with at least one of the components included on the first bonus selection segment and at least one of the components included on the second bonus selection segment such that a bonus award indicia is formed by a bonus award component selected from the first bonus selection segment and a bonus award component selected from the second bonus selection segment.

Another example of a bonus selection apparatus could include at least one three-dimensional object with the bonus award indicia arranged on the surface of the bonus selection apparatus. In one such optional embodiment, the bonus selection apparatus is rotationally mounted at the device so that it can be controlled to rotate. Examples of such an optional embodiment could include spheres, ellipsoids, or like shapes that are adapted to rotate about an axis.

It is noted that the bonus selection apparatus may include a video display adapted to depict an object with the bonus award indicia arranged on the surface of the bonus selection apparatus. In one such optional embodiment, the object is depicted as rotationally mounted at such that the object can be depicted as rotating.

In optional embodiments, the bonus award indicia may be visible, or may be concealed. In an optional embodiment in which the bonus award indicia are concealed, the bonus award indicia may be revealed upon selection (as described in greater detail below).

The device includes a bonus award escrow display and a data storage, both of which are in communication with the game processor. The data storage stores instructions executable by the game processor to conduct a game method.

The present invention also includes a method for conducting a game. In an optional embodiment, the game method includes designating at least one bonus selection event and at least one bonus award event.

The bonus selection event could take many different forms. For example, in one optional embodiment, a bonus selection event occurs in each primary game. In another optional embodiment in which the primary game outcomes include winning outcomes and losing outcomes, a bonus selection event may occur upon each primary game in which a winning outcome occurs or each primary game in which a losing outcome occurs. In yet another optional embodiment in which the primary game outcome includes the display of a game indicia, a bonus selection event may occur in each primary game in which at least one designated game indicium is displayed in a primary game outcome. Optionally, the designation may include a combination of multiple game indicia. Conversely, in an optional embodiment, the bonus selection event may occur independent of the primary game outcomes. For example, in one such optional embodiment, the bonus selection event may occur randomly.

Similarly, bonus award events could take many different forms. In an optional embodiment, each bonus award event may include a primary game outcome. For example, in an optional embodiment in which the primary game outcome includes the display of a game indicia, a bonus award event may occur in each primary game in which at least one designated game indicium is displayed in a primary game outcome. Again, in an optional embodiment, the designation may include a combination of multiple game indicia. In yet another optional embodiment, a bonus award event may include conducting a secondary game separate from said primary game.

A player wager on a primary game is received. A primary game outcome is selected for the primary game and the player wager is resolved based on the primary game outcome. A determination is made whether a bonus selection event has occurred and, if so, the bonus selection apparatus is controlled to select at least one bonus award indicia in response to a bonus selection event. In an optional embodiment, multiple bonus award indicia are selected.

Selected bonus award indicia are displayed at the bonus award escrow display. Optionally, the selected bonus award indicia are stored and displayed at the bonus award escrow display until a bonus award event. For example, in an optional embodiment it is contemplated that at least one primary games may be conducted between a bonus award event and a bonus selection event such that at least one of said selected bonus award indicia displayed at said bonus award escrow display is stored for one or more primary games.

In response to a bonus award event, a bonus award displayed at the bonus award escrow display is awarded to a player. In an optional embodiment in which multiple bonus award indicia are selected and displayed at the bonus award escrow display, each selected bonus award indicium may be associated with a different bonus award event.

DESCRIPTION

Figure 1:
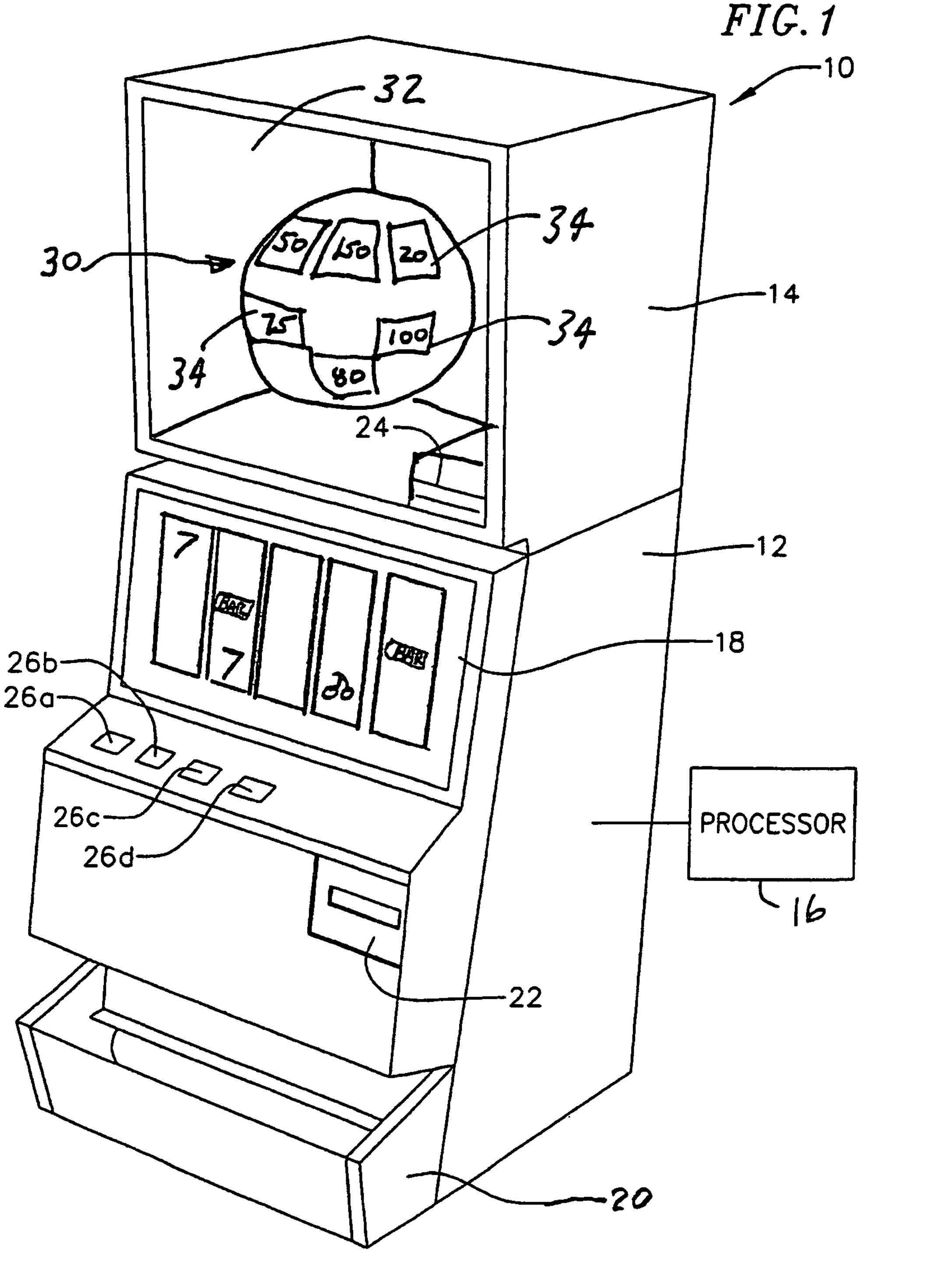
FIG. 1 is a front perspective view of a device according to an embodiment of the present invention.

Reference is now made to the figures wherein like parts are referred to by like numerals throughout. Turning to FIG. 1 there is shown an embodiment of a gaming device 10 according to the present invention. The device 10 includes a housing 12 supporting a bonus device compartment 14. The housing 12 contains a game processor 16, which controls the various aspects of the gaming device 10. As shown the housing 12 also mounts a primary game display 18, which may be embodied as a video display such as a CRT, plasma, LCD, or other electronic display or may be embodied as a view glass to view three or more electro-mechanical reels as is known in the art. For purposes of illustration, the primary game display 18 is depicted as a video display of a five-reel slot machine game. It should be understood, however, that the primary game may take any slot machine or gaming machine form such as by being a 3-reel spinning reel slot machine, video poker game, video keno, video lottery, video blackjack or the like.

Optionally, the housing 12 mounts a plurality of control buttons positioned below the primary game display 18 to provide input to the game processor 16 for conduct of the primary game. For example, there may be provided a CASH OUT button 26*a* which, if depressed by the player, controls the game processor 16 to release stored game credits to the player in the form of tokens, voucher or the like. In an optional embodiment, the player's wagering choices may be input using a BET ONE button 26*b* to place unit-sized wagers, a MAX BET button 26*c* to place a wager for the maximum amount permitted, and a SPIN button 26*d* to signal the end of wagering (if the player has not placed the maximum wager permitted) and prompt play of the primary game. Optionally, input may be received by physical buttons (as shown in the optional embodiment of FIG. 1) or through touch areas on a touch screen.

To enable a player to purchase game credits, the device 10 may include a bill acceptor 22 to receive currency, vouchers, or the like. Other means such as a token acceptor (not shown) or debit or credit card reader (not shown) may be provided.

A token accepting tray 20 may also be provided to hold tokens dispensed by the device 10 when the player cashes out any stored game credits. As may be appreciated, the device may return stored game credits in the form of vouchers that may be printed from a printer in a ticket in-ticket out receiver that accepts bills or vouchers, and dispenses vouchers.

To play the primary game, the player accumulates game credits in the device 10 as by inserting a cash note, script or voucher into the cash validator 22. The player then decides how much to wager. Thus, in an example where the player decides to wage the maximum amount, the player would input his or her selection by touching the MAX BET button 26*c*. The wager is deducted from the stored game credits and the game processor 16 is prompted to initiate the primary game.

As suggested above, the primary game may take any form. While the example described herein is directed to a reel slot game, this should be understood as illustrative rather than limiting, since the game could take other forms without departing from the scope of the present invention.

In an example where the primary game is a reel slot game, the game processor 16 randomly select and display at the primary game display, a primary game outcome represented by a matrix of game symbols. As is known with slot machine games, the matrix of symbols defines numerous pay lines, e.g. horizontal rows, diagonals, reflecting, through the matrix. The game processor 16 tests each pay line that has been wagered upon and if a pay line has one of a predetermined schedule of winning outcomes or if the matrix has scattered symbols combinations, the player is issued an award. If a pay line does not embrace a winning symbol combination, the player loses their wager amount for that pay line. Thus the player may obtain numerous and frequent primary game winning outcomes. For winning outcomes, the player receives an award typically in the form of game credits summed into the game credit inventory.

According to an embodiment of the present invention, one or more primary game outcomes (such as the appearance of a designated symbol or combination of symbols on a pay line or scattered in the matrix) may define a bonus game trigger. Should the player obtain such an outcome (optionally subject to additional conditions such as a minimum wager) the game processor 16 detects the triggering condition and controls the gaming device 10 to enable the bonus phase. Alternatively, the primary game may contain no apparent trigger combination that enables the bonus event. The wheel or other bonus apparatus may be set by the game processor to be award at random, without the use of a trigger combination in the primary game, in a "mystery prize" format.

Figure 2:
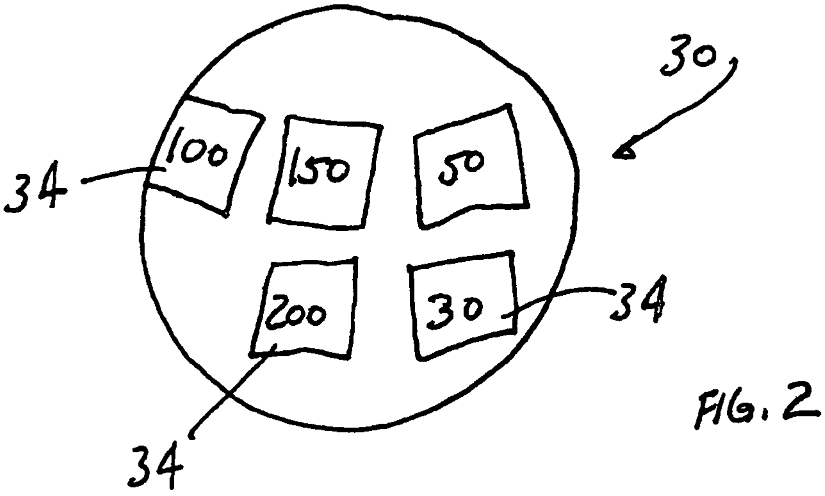
FIG. 2 is a front view of a bonus selection apparatus according to an embodiment of the present invention.

To provide for the play and presentation of the bonus phase of the gaming device 10, the compartment 14 includes a display that may be embodied as a physical, three-dimensional object, a two-dimensional physical display such as a wheel, or as a video display depicting a two- or three-dimensional object. With reference to FIGS. 1 and 2 there is shown a rotatable wheel 30 contained within the compartment 14. In an optional embodiment, the wheel 30 is mounted for rotation within the compartment 14. To provide the three-dimensional effect using a video display, the display may be done using 3-D technology where the player is provided with viewing glasses (e.g. disposable 3-D glasses) or the display may be embodied as overlaying displays to produce the three-dimensional effect.

For example, a wheel 30 includes a plurality of surface panels 34, each of which having a display of a bonus award indicia (e.g. a multiplier, a credit amount, a cash amount, a bonus event, or the like) at each section of the wheel. For example, and as suggested in FIG. 2, each panel 34 may have imprinted thereon a bonus amount. These display within the wheel use LED, LCD, liquid quartz, video or other display technology to provide for changing the awards amount at any panel during the course of the game. The bonus amount to be won by the player may change upon certain conditions in the overall game, such as the player wagering an increased number of coins or credits.

While the gaming device 10 is idle, the wheel 30 may be controlled to rotate to provide a visual display to attract players. Lights may be disposed on the wheel 30 and lit in conjunction with rotation to increase the visual attraction of the device 10.

When a bonus trigger condition is obtained, the game processor 16 controls the bonus feature to select and display the bonus award for the player. With reference to FIGS. 1 and 2, the game processor 16 randomly selects a bonus amount from a schedule of bonus amounts (the amounts may be arranged in a non-uniform probability distribution so that certain amounts are more likely to be selected than others) and controls the sphere 30 to display the amount. For example, the game processor 16 may control the wheel or 3-D object (which may represent an soccer ball, baseball, golf ball or other spherical object consistent with the theme of the primary game), in a first mode where the wheel 30 rotates and processes through various bonus amounts to increase the excitement and anticipation prior to display of the amount to be awarded. Within the compartment 14 there may be provided lights to increase the visual appearance of the bonus device 30. Sound may also be provided to further contribute to the entertainment value of the bonus feature for the player and bystanders.

Figure 3:
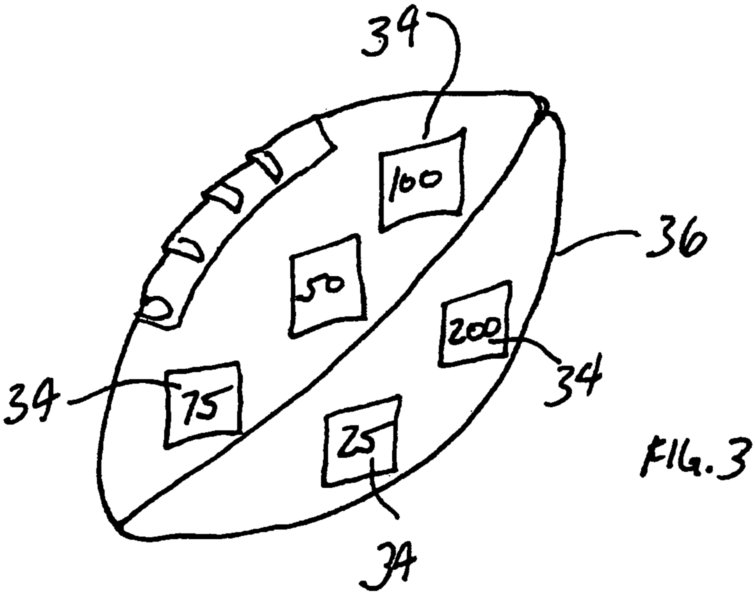
FIG. 3 is a front view of a bonus selection apparatus according to an embodiment of the present invention.

With reference to FIG. 3 there is shown an embodiment where the bonus feature includes a three-dimensional object simulating a football 36 having bonus revealing surface elements 34 thereon. When the bonus phase is triggered the football 36 is shown to spin and/or gyrate to eventually reveal the surface element with the bonus. The movement of the football 36 is preferably accompanied by sounds and lights to enhance the sensory impact of the bonus feature to the player and bystanders.

Figure 4:
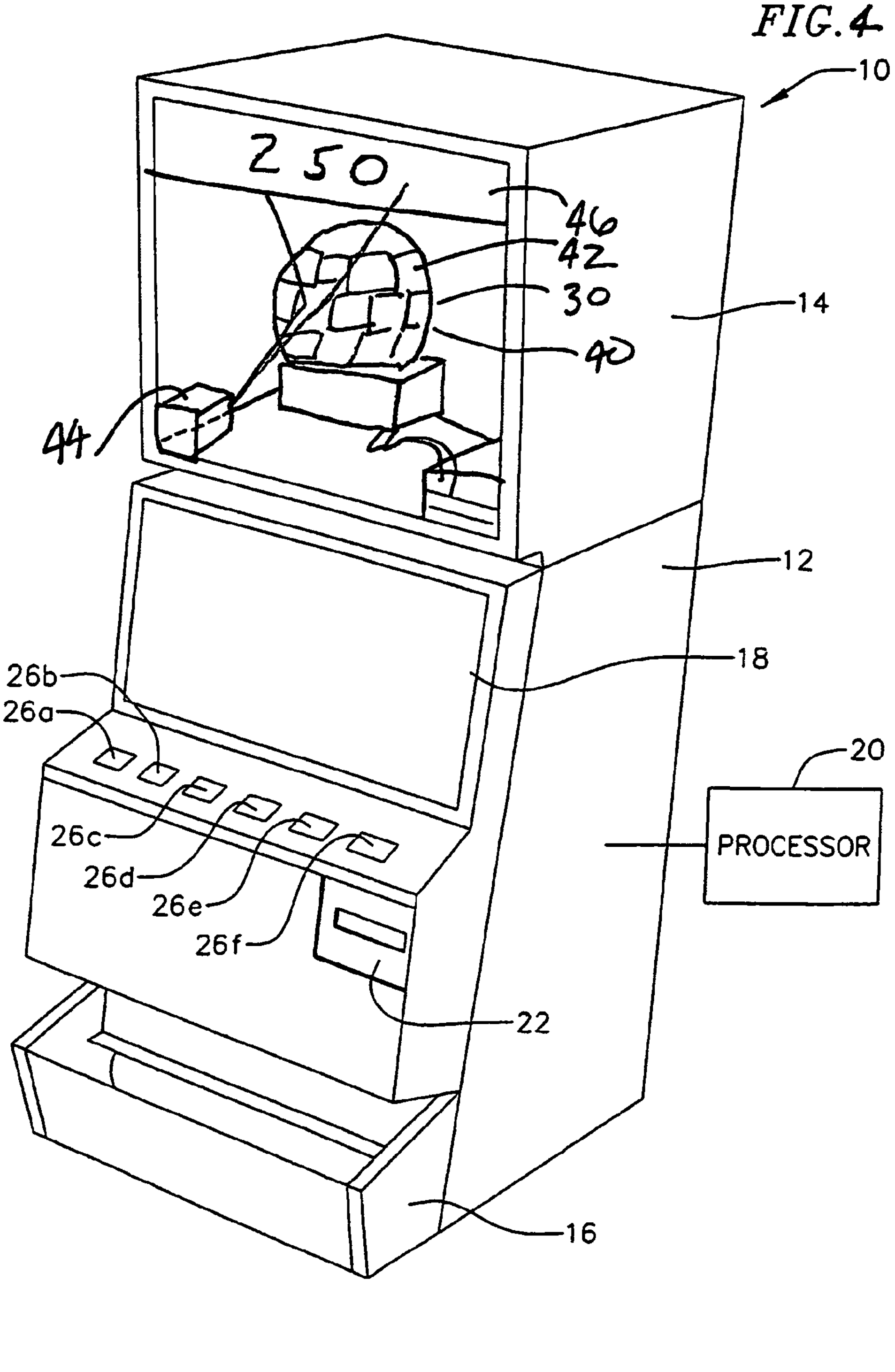
FIG. 4 is a front perspective view of a device according to an embodiment of the present invention.

Turning to FIG. 4 there is disclosed another embodiment of the invention. According to this embodiment the three-dimensional object such as the sphere 30 is provided with a surface 40 having one or more reflecting elements 42. A projector 44 is disposed in the device 10 to project views onto the sphere 30 for reflection and display to the player. As shown, the glass 32 may have a panel 46 to receive the projection for the display of the same. Accordingly, the wheel 30 may be rotated while the device 10 is idle with the projector 44 projecting light onto the wheel 30 to create an attractive display to bring a play to the game. Upon placing a wager the game processor 16 discontinues the idle mode for the display and device 10 primary game is played by the player. Upon obtaining a triggering condition, the wheel 30 is rotated and the projector 44 ultimately projects the bonus to be awarded which is reflected by the sphere to the panel 46.

Figure 5:
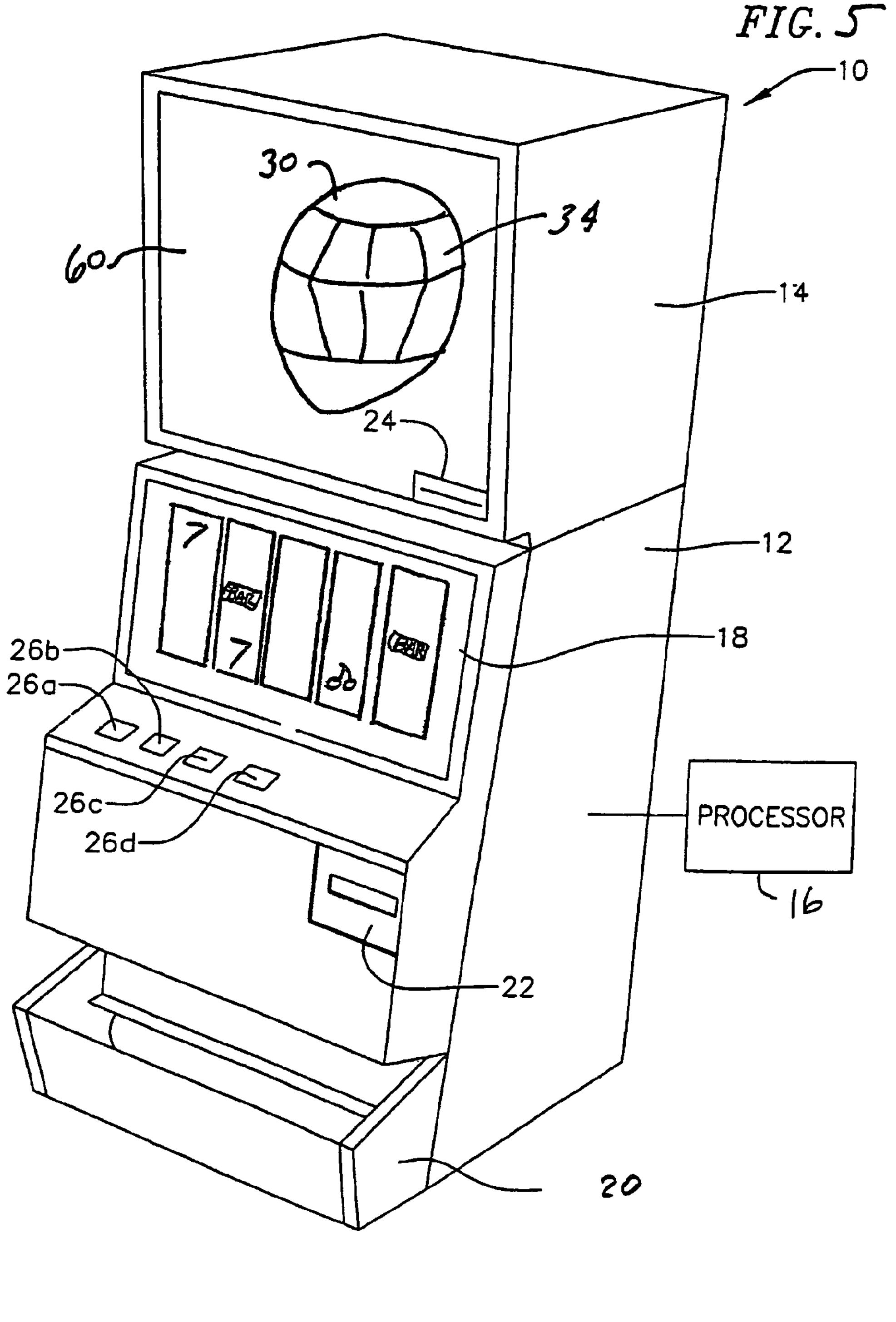
FIG. 5 is a front perspective view of a device according to an embodiment of the present invention.

Turning to FIG. 5 there is shown a further embodiment of FIG. 1 wherein the display includes a video display 60 such as a CRT monitor, LCD, or plasma display where the wheel 30 is a virtual sphere displayed at the display. The display 60 is controlled by the game processor 16 to have an idle mode display where the display 60 may display the sphere 60 rotating and gyrating to attract a player to the device 10. The game processor 16 controls the display 60 to display the sphere 30 in various modes including the display of any bonus awards.

Figure 6:
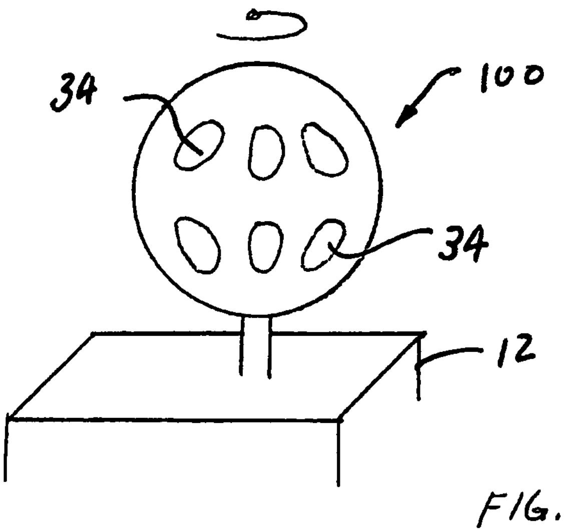
FIG. 6 is a front perspective view of a bonus selection apparatus according to an embodiment of the present invention.

FIG. 6 shows another embodiment of the bonus display 100 is embodied as a free standing sphere with panels 34 supported by the housing 12. The free standing sphere 100. By projecting the sphere above the housing 12, the device 10 presents an attractive game for players and for passers by.

Figure 7:
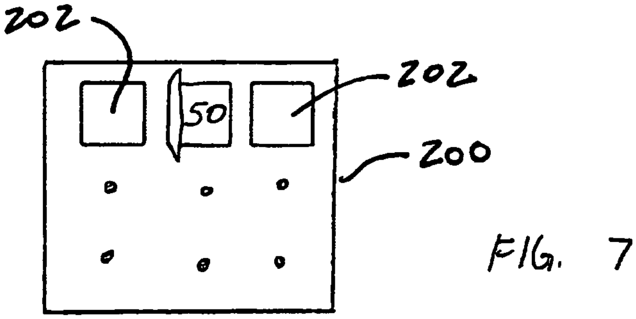
FIG. 7 is a front view of a bonus selection apparatus according to an embodiment of the present invention.

In FIG. 7 there is shown a further embodiment of the bonus display embodied as a box 200 including a plurality of mechanical doors 202 which are controlled to open to reveal the bonus.

Figure 8:
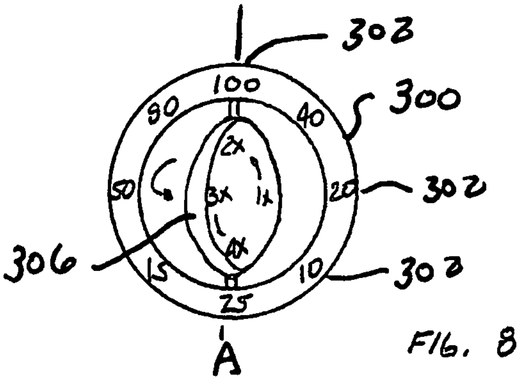
FIG. 8 is a front perspective view of a bonus selection apparatus according to an embodiment of the present invention.

FIG. 8 shows yet a further embodiment of the bonus display including an outer ring 300 to display bonus awards. For example, the outer ring 300 may include backlit segments 302 which are selectively backlit to display a bonus amount. Alternatively, the outer ring 300 may be controlled to spin or simulate spinning, to register the bonus award amount at an index position which signifies the award.

Within the outer ring 300 is an inner display 306 which is controlled to spin about an axis A within the outer ring 300. The inner display 306 contains a display of bonus award modifiers such as multipliers or additional award amounts. When the bonus is triggered, the outer ring 30 and inner display 306 are controlled by the game processor 16 to (1) display an award amount from the outer ring 300 and (2) a modifier with the inner display 306. For example, the outer ring 300 may be controlled to simulate spinning to register a bonus award amount at an index, e.g. 100 credits. The inner display 306 spins and processes through various multiplier awards to eventually stop in a position coplanar with the outer ring 300 whereby a multiplier amount likewise registers with the index whereby the player wins the award of the outer ring 300 multiplied by the multiplier of the inner display 306.

It must be understood that the three-dimensional objects need not be spherical, oblong or any other shape. They could be cubical as a die with six or more sides, parallelpipedal or any other shape. Further, more than one object may be included in the display.

Figure 9:
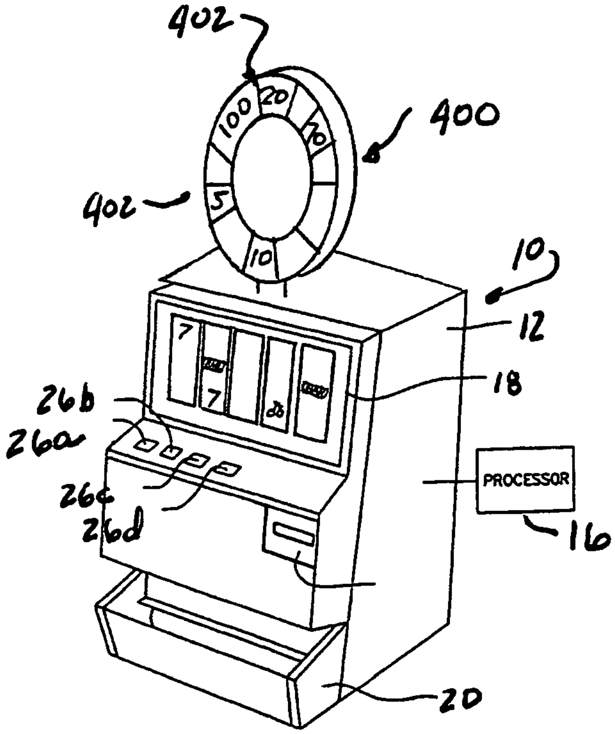
FIG. 9 is a front perspective view of a device according to an embodiment of the present invention.

FIG. 9 shows another embodiment of the present invention. According to this embodiment the device 10 has a housing 12 supporting an upstanding video (LCD, CRT, plasma) display 400 which may be circular, square or any other desired shape. The display 400 reveals a plurality of award values 402 as controlled by the game processor 16. The game processor 16 may control the display 400 to display the values flashing or progressing or moving in the display 400 until the ultimate award is revealed.

Figure 10:
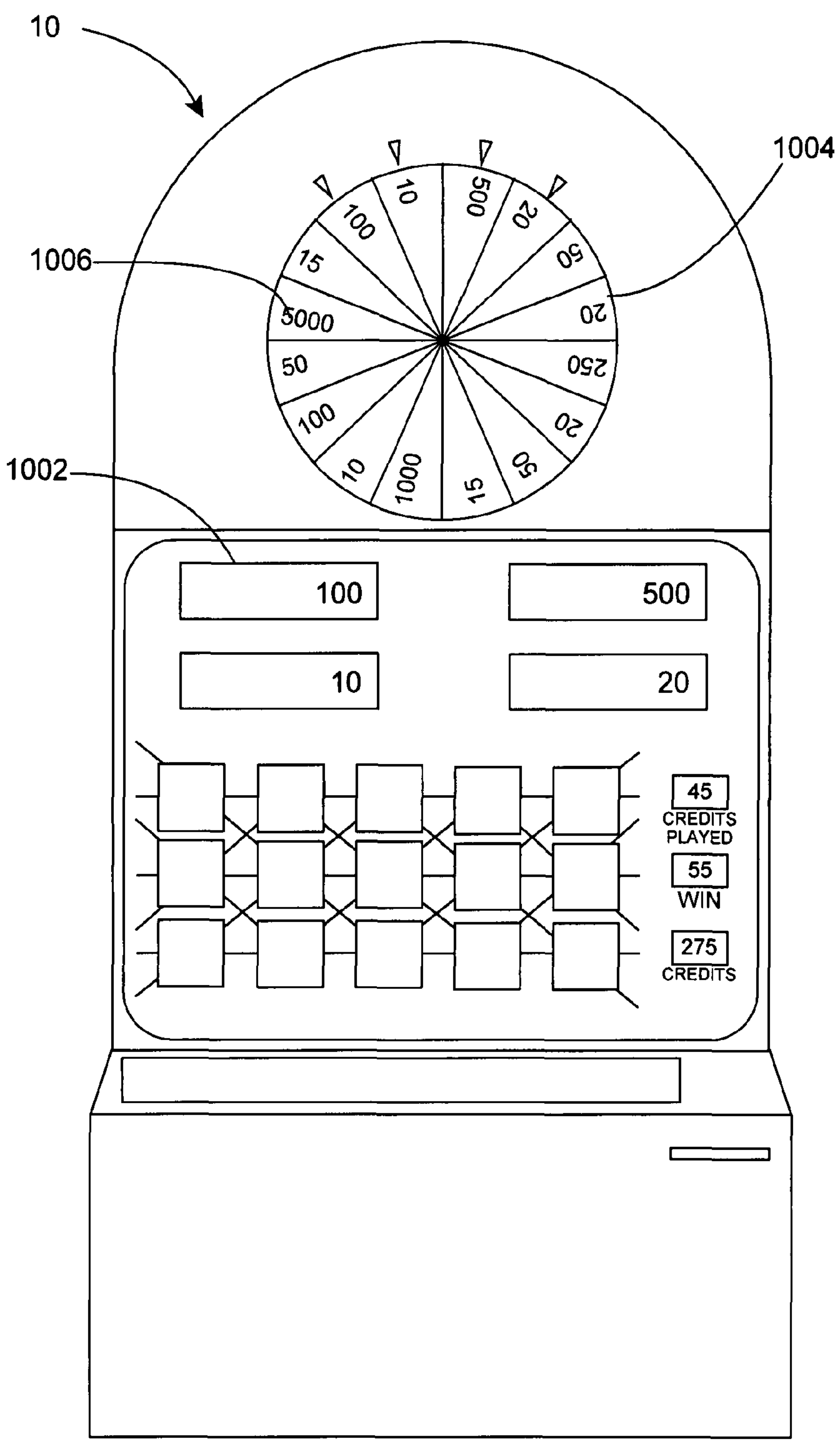
FIG. 10 is a front view of a device according to an embodiment of the present invention.
Figure 11:
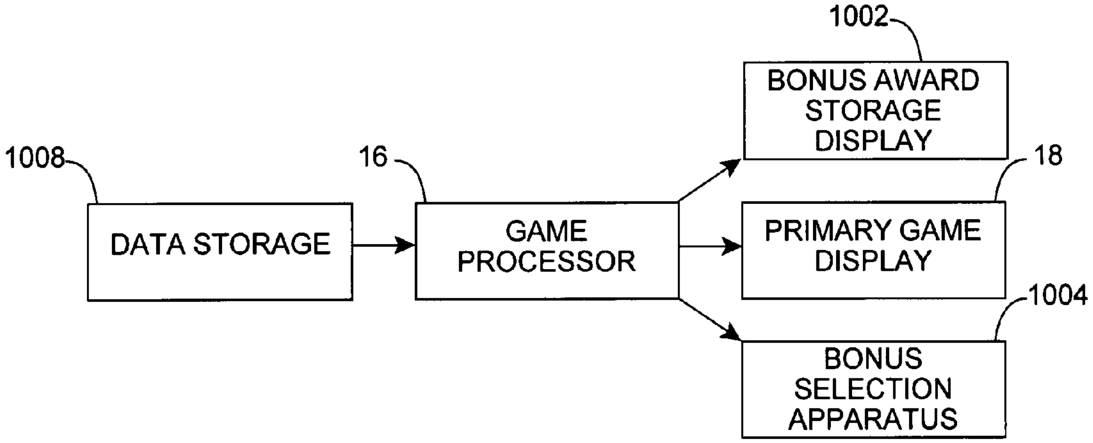
FIG. 11 is a block diagram of a device according to an embodiment of the present invention.

An optional embodiment of the present invention is shown in FIGS. 10 and 11. In this optional embodiment, the gaming machine 10 includes a bonus award escrow display 1002. That is, such an optional embodiment includes a bonus selection apparatus 1004 (such as those previously described) and a primary game display 18 (such as those previously described), and additionally incorporates a bonus award escrow display 1002. The bonus award escrow display 1002 could be a separate display or may be incorporated into the bonus selection apparatus 1004 or primary game display 18. As such, the bonus award escrow display 1002 could take any form, such as an electronic display in form of a liquid crystal display ("LCD"), light emitting diode ("LED") board, plasma display, cathode ray tube ("CRT") monitor, or the like, a mechanical display using reels, dials, or other form of display. In the example of FIG. 10, the bonus award escrow display 1002 consists of four fields appearing on the same screen as the primary game display 18.

According to this embodiment, bonus award indicia 1006 selected in response to a bonus selection event are "stored" and displayed at the bonus award escrow display 1002. In storing selected bonus award indicia 1006 at the bonus award escrow display 1002, the player can view bonuses that may be available through play of the primary game.

Referring to FIGS. 10 and 11, the bonus award escrow display 1002 communicates with the game processor 16. As discussed above, the game processor also communicates with a bonus award selection apparatus 1004 and a primary game display 18. The game processor 16 executes instructions stored at a data storage 1008. As may be appreciated, the data storage 1008 could take any form, including flash memory, optical storage, magnetic storage, RAM, ROM, EPROM, EEPROM, EAROM, or any other form of data memory. The data storage 1008 may also store parameters used in the conduct of the primary game and the feature described herein, such as pay outs for primary game outcomes, correlations between bonus award indicia and bonus awards, bonus selection events, bonus award events, or the like.

Figure 12:
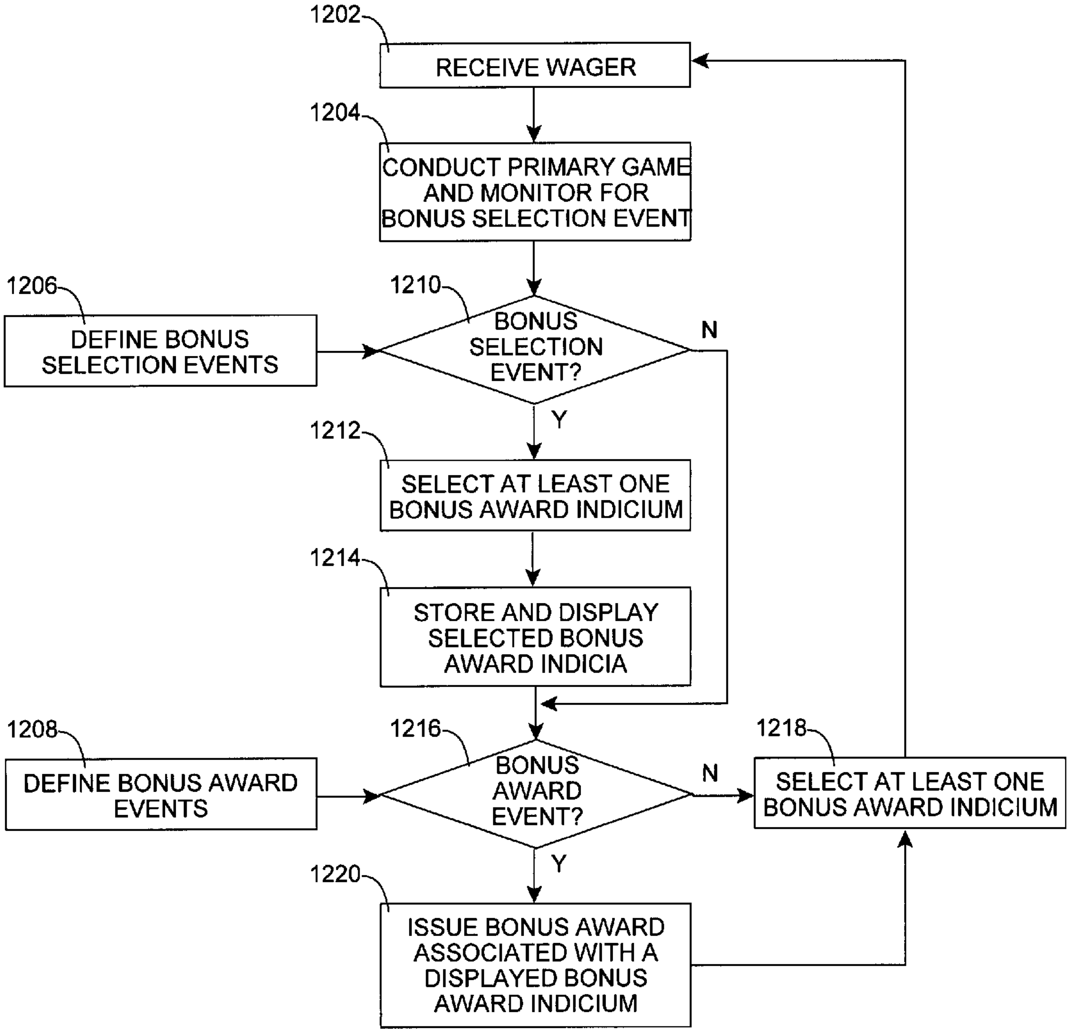
FIG. 12 is a flow chart of a method according to an embodiment of the present invention.

In an optional embodiment, the instructions executable by the game processor include a method for conducting a game according to an embodiment of the present invention. For example, in one such optional embodiment shown in FIG. 12, a wager is received 1202 from a player for play of a primary game. As discussed above, the primary game could take any form. In the example of FIG. 10, the primary game is a video reel slot game. However, it is contemplated that the primary game could take any form, including card games, numbers games (e.g. keno, lottery, or the like), dice games, tile games, or the like, and, consequently, may incorporate any type of game indicia for conduct of the primary game such as reel slot symbols, cards, numbers, dice, tiles, or the like.

Returning to FIG. 12, the primary game is conducted to completion. Generally speaking, a primary game includes the selection of one or more game indicia and a determination whether the game indicia selected form a winning outcome or a losing outcome. However, this should be understood to be generally illustrative of primary games generally and it is contemplated that any type of primary game could be conducted.

Through the course of conducting the primary game, the game is monitored 1204 for whether a bonus selection event occurs. It is contemplated that, in various optional embodiments, a bonus selection event may occur before a primary game is conducted, while a primary game is conducted, after a primary game is conducted, or any combination thereof. That is, it is contemplated that, in different optional embodiments, a bonus selection event may be intended to occur before the primary game, in which case a determination is made before the primary game is conducted; a bonus selection event may be intended to occur during the primary game, in which case a determination is made while the primary game is conducted; a bonus selection event may be intended to occur after the primary game, in which case a determination is made after the primary game is conducted; or a bonus selection event may be intended to occur at multiple points, in which case a determination is made at multiple points.

Thus, the bonus selection event or events could be defined 1206 to take many different forms. For example, in one optional embodiment, a bonus selection event occurs on every primary game. In other words, every primary game triggers a bonus selection event. In another optional embodiment, the primary game produces a primary game outcome, and a bonus selection event occurs on certain designated primary game outcomes. Examples of such an optional embodiment would include embodiments in which losing outcomes are bonus selection events, winning outcomes are bonus selection events, and/or primary game outcomes that include some predefined trigger occurrence (such as the appearance of a designated game indicia or combination of game indicia).

In another optional embodiment, the bonus selection event occurs independent of the primary game. For example, in one optional embodiment, a random trigger is used as a bonus selection event. In another optional embodiment, a bonus selection event may occur in a separate game (such as a secondary screen or bonus game) that is conducted separate from the primary game.

If a bonus selection event occurs 1210, at least one bonus award indicium 1006 is selected 1212 using the bonus selection apparatus 1004. That is, in response to a bonus selection event, the bonus selection apparatus 1004 is controlled to select at least one bonus award indicium 1006. In an optional embodiment, such as that shown in FIG. 10, multiple bonus award indicia 1006 are selected. In the example of FIG. 10, four bonus award indica are selected using four arrows that align with four segments on a rotatable wheel. In the example shown, the four bonus awards include 100 credits, 10 credits, 500 credits, and 20 credits.

The selected bonus award indicia are displayed 1214 at the bonus award escrow display 1002. Thus, in the example of FIG. 10, the four fields comprising the bonus award escrow display 1002 show "100" to signify the 100 credit bonus award indicia, "10" to signify the 10 credit bonus award indicia, "500" to signify the 500 credit bonus award indicia, and "20" to signify the 20 credit bonus award indicia.

The bonus award escrow display "stores" and displays the selected bonus award indicia until some subsequent occurrence. The subsequent occurrences include at least a bonus award event, but could also include other events. It is contemplated that the subsequent occurrences may occur during a single "game," in one optional embodiment, or may occur after one or more interceding primary games, in another optional embodiment. That is, in an optional embodiment, the bonus selection event may be separated from a bonus award event by one or more primary games.

For example, the bonus award escrow display 1002 may be reset after a bonus award event. Thus, in such an optional embodiment, the bonus award indicia are stored and displayed at the bonus award escrow display until the occurrence of a bonus award event.

In another optional embodiment, the bonus escrow display may be reset after a bonus award event or a predetermined quantity of primary games, whichever occurs first. Thus, in such an optional embodiment, the selected bonus award indicia are stored and displayed at the bonus award escrow display 1002 until a bonus award event or until a predetermined quantity of primary games are conducted.

In another optional embodiment, the bonus escrow display may be reset when a subsequent bonus selection event occurs with new bonus award indicia replacing one or more of the bonus award indicia stored and displayed on the bonus award escrow display 1002. Other events causing a reset, replenishing, or replacing could include events occurring in a primary game or a secondary game. For example, a predefined primary game outcome could cause one or more of the bonus award indicia stored and displayed on the bonus award escrow display 1002 to disappear or be replaced.

As alluded to above, at least one bonus award event is defined 1208. A bonus award event triggers the awarding 1220 to the player of a bonus award associated with one or more of the selected bonus award indicia that are stored and displayed at the bonus award escrow display 1002. In an optional embodiment where multiple bonus award indicia are selected and displayed at the bonus award escrow display 1002, each bonus award indicia may be associated with a bonus award event, so that, in one such optional embodiment, different occurrences result in the awarding of different bonus awards. In an optional embodiment, the bonus award escrow display 1002 identifies the bonus award events associated with bonus awards.

Bonus award events may take many different forms. For example, in one optional embodiment, a bonus award event may be independent of the primary game. In one such optional embodiment, the bonus award event is a random occurrence. In another such optional embodiment, the bonus award event occurs in a secondary game conducted separately from the primary game. Examples of such secondary games include bonus screens, bonus games, or the like.

In another optional embodiment, bonus award events are occurrences relating to the primary game. Thus, in one such optional embodiment, a bonus award event could be the occurrence of a predefined primary game outcome, such as a winning outcome, a losing outcome, and/or a primary game outcome including a designated game indicia or combination of game indicia.

If a bonus award event does not occur, the wager may be resolved based on the primary game outcome and the selected bonus award indicia may be stored through a subsequent iteration of the primary game. However, it is also contemplated that man alternate optional embodiment, the bonus award indicia displayed at the bonus award escrow display 1002 may be reset with each primary game.

While certain embodiments of the present invention have been shown and described it is to be understood that the present invention is subject to many modifications and changes without departing from the spirit and scope of the invention presented herein.

I claim:

1. A gaming device for conducting a game for a player comprising:

a game processor;

a primary game display in communication with said game processor;

a bonus selection apparatus in communication with said game processor, said bonus selection apparatus including a plurality of bonus award indicia associated with one or more bonus awards;

a bonus award escrow display in communication with said game processor;

a data storage in communication with said game processor, said data storage storing instructions executable by said game processor to conduct a game method comprising:

designating at least one bonus selection event and at least one bonus award event, wherein said at least one bonus selection event is conducted by said gaming device without player selection, and wherein each bonus selection event is different from each bonus award event, and wherein each bonus award event is triggered separately from each bonus selection event and each bonus award event includes, as its trigger a primary game outcome;

receiving a player wager on a primary game;

conducting said primary game including randomly selecting a primary game outcome for said primary game;

resolving said player wager based on said primary game outcome;

determining whether at least one bonus selection event has occurred and, if so, controlling said bonus selection apparatus to select at least one bonus award indicia without receiving any player selection, in response to said at least one bonus selection event;

displaying selected bonus award indicia at said bonus award escrow display where said bonus award indicia is held until the occurrence of at least one bonus award event, including holding said bonus award indicia at said bonus award escrow display until a separate and independent bonus award event occurs in the same or later primary game; and awarding at least one bonus award associated with the bonus award indicia displayed at said bonus award escrow display in response to the occurrence of said at least one bonus award event triggered from said primary game.

2. The device of claim 1 wherein said bonus selection apparatus comprises at least one two-dimensional object with said bonus award indicia arranged on the surface of said bonus selection apparatus, said bonus selection apparatus rotationally mounted at said device such that a step of controlling said bonus selection apparatus comprises rotating said bonus selection apparatus.

3. The device of claim 2 wherein said bonus selection apparatus is a wheel adapted to rotate about an axis and said bonus award indicia are arranged about the perimeter of said wheel.

4. The device of claim 2 wherein said bonus selection apparatus comprises a first bonus selection segment and a second bonus selection segment adapted for relative rotation with respect to one another, said bonus award indicia arranged about the perimeter of at least one of said first bonus selection segment and said second bonus selection segment.

5. The device of claim 4 wherein at least one of said bonus award indicia is divided into two or more bonus award indicia components, with at least one of said bonus award indicia components included on said first bonus selection segment and at least one of said bonus award indicia components included on said second bonus selection segment.

6. The device of claim 1 wherein said bonus selection apparatus comprises at least one three-dimensional object with said bonus award indicia arranged on the surface of said bonus selection apparatus, said bonus selection apparatus rotationally mounted at said device such that a step of controlling said bonus selection apparatus comprises rotating said bonus selection apparatus.

7. The device of claim 6 wherein said bonus selection apparatus is a sphere adapted to rotate about an axis and said bonus award indicia are arranged about the surface of said sphere.

8. The device of claim 6 wherein comprising said bonus selection apparatus is an ellipsoid adapted to rotate about an axis and said bonus award indicia are arranged about the surface of said ellipsoid.

9. The device of claim 1 wherein said bonus selection apparatus comprises a video display adapted to depict an object with said bonus award indicia arranged on the surface of said bonus selection apparatus, said object depicted as rotationally mounted at such that a step of controlling said bonus selection apparatus comprises depicting said object to rotate.

10. The device of claim 1 wherein said bonus award indicia are concealed on said bonus selection apparatus, and a step of controlling said bonus selection apparatus to select bonus award indicia includes revealing at least said selected bonus award indicia on said bonus selection apparatus.

11. The device of claim 1 wherein said instructions stored at said data storage and executed by said game processor include resetting said bonus award escrow display after a bonus award event or a predetermined quantity of primary games, whichever occurs first.

12. The device of claim 1 wherein said instructions stored at said data storage and executed by said game processor include accumulating bonus award indicia at said bonus award escrow display when multiple bonus selection events occur between bonus award events.

13. A method for conducting a game for a player at a gaming device of a type having a primary game display for displaying a randomly selected primary game outcome in a primary game, said selected primary game outcome resolving a player wager on said primary game, the method comprising:

providing a bonus selection apparatus including a plurality of bonus award indicia associated with one or more bonus awards;

providing a bonus award escrow display;

designating at least one bonus selection event and at least one bonus award event wherein each bonus selection event is independent of any and all said primary game outcomes, and wherein said at least one bonus selection event is conducted by said gaming device without player selection, and wherein each bonus selection event is different from each bonus award event, and wherein each bonus award event is triggered separately from each bonus selection event and each bonus award event includes, as its trigger, a primary game outcome;

determining whether the bonus selection event has occurred and, if so, controlling said bonus selection apparatus to select at least one bonus award indicium, without receiving any player selection, in response to the bonus selection event;

displaying selected bonus award indicia at said bonus award escrow display;

holding said bonus award indicia until an occurrence of at least one bonus award event, including holding said bonus award indicia at said bonus award escrow display until a bonus award event that is separate and independent of said bonus selection event occurs in the same or later primary game; and awarding at least one bonus award associated with the bonus award indicia displayed at said bonus award escrow display in response to a bonus award event triggered from said primary game.

14. The method of claim 13 wherein said bonus selection event occurs in each primary game.

15. The method of claim 13 wherein said bonus selection event occurs randomly.

16. The method of claim 13 wherein said primary game outcome includes the display of a game indicia and said bonus award event occurs in each primary game in which at least one designated game indicium is displayed in a primary game outcome.

17. The method of claim 13 wherein the plurality of bonus award indicia are selected and displayed at said bonus award escrow display and each said selected bonus award indicium is associated with a different bonus award event.

18. The method of claim 13 wherein said bonus award event includes conducting a secondary game separate from said primary game.

19. The method of claim 13 further comprising resetting said bonus award escrow display after a bonus award event or a predetermined quantity of primary games, whichever occurs first.

20. The method of claim 13 further comprising accumulating bonus award indicia at said bonus award escrow display when multiple bonus selection events occur between bonus award events.

21. A method for conducting a game for a player at a gaming device, the method comprising:

providing a primary game display;

receiving a player wager on a primary game;

conducting the primary game by randomly selecting a primary game outcome for said primary game;

resolving said player wager based on said primary game outcome;

providing a bonus selection apparatus including a plurality of bonus award indicia associated with one or more bonus awards;

providing a bonus award escrow display;

designating at least one bonus selection event and at least one bonus award event, each bonus selection event independent of any and all said primary game outcomes, and wherein said at least one bonus selection event is conducted by said gaming device without player selection, and wherein each bonus selection event is different from each bonus award event, and wherein each bonus award event is triggered separately from each bonus selection event and each bonus award event includes, as its trigger, a primary game outcome;

determining whether the bonus selection event has occurred and, if so, controlling said bonus selection apparatus to select at least one bonus award indicium, without receiving any player selection, in response to the bonus selection event;

displaying and holding selected bonus award indicia at said bonus award escrow display until the occurrence of a bonus event, including holding said bonus award indicia at said bonus award escrow display until a bonus award event that is separate and independent of said bonus selection event occurs in the same or later primary game; and awarding at least one bonus award associated with a bonus award indicium displayed at said bonus award escrow display in response to a bonus award event triggered from a primary game.

22. The method of claim 21 wherein said bonus selection event occurs in each primary game.

23. The method of claim 21 wherein said bonus selection event occurs randomly.

24. The method of claim 21 wherein said primary game outcome includes the display of game indicia and said bonus award event occurs in each primary game in which at least one designated game indicium is displayed in said primary game outcome.

25. The method of claim 21 wherein the plurality of bonus award indicia are selected and displayed at said bonus award escrow display and each said selected bonus award indicium is associated with a different bonus award event.

26. The method of claim 21 wherein said bonus award event includes conducting a secondary game separate from said primary game.

27. The method of claim 21 further comprising resetting said bonus award escrow display after a bonus award event or a predetermined quantity of primary games, whichever occurs first.

28. The method of claim 21 further comprising accumulating bonus award indicia at said bonus award escrow display when multiple bonus selection events occur between bonus award events.

* * * * *